United States Patent Office.

FRIEDRICH KRECKE AND IGNAZ ROSENBERG, OF BIEBRICH, GERMANY, ASSIGNORS TO KALLE & CO., OF SAME PLACE.

BLUE-BLACK DISAZO DYE.

SPECIFICATION forming part of Letters Patent No. 546,069, dated September 10, 1895.

Application filed June 20, 1895. Serial No. 553,477. (Specimens.) Patented in Germany September 10, 1891, No. 73,901.

*To all whom it may concern:*

Be it known that we, FRIEDRICH KRECKE, doctor of philosophy, a subject of the King of Prussia, German Emperor, and IGNAZ ROSENBERG, doctor of philosophy, a subject of the King of Hungary, residing at Biebrich-on-the-Rhine, in the Empire of Germany, have invented certain new and useful Improvements in the Manufacture of a Bluish-Black Disazo Dye-Stuff, (for which our assignees, KALLE & Co., have already obtained a patent in Germany, numbered 73,901, dated September 10, 1891,) of which the following is a specification.

In order to carry out our invention, we dissolve 35 kilos (thirty-five kilograms) of alpha$_1$ naphthylamine-beta$_2$ beta$_3$ disulfonate of sodium in 200 liters (two hundred liters) of water acidulated by 25 kilos (twenty-five kilograms) muriatic acid of 20° Baumé, and diazotize in the cold by addition of 7 kilos (seven kilograms) of sodium nitrite in aqueous solution. The so-obtained diazo-naphthalene disulfo-acid is stirred into a cold solution of 25 kilos (twenty-five kilograms) of alpha$_1$ naphthylamin-beta$_4$ monosulfonate of sodium (which is obtained by nitration of naphthalene-beta-monosulfo-acid in sulfuric-acid solution and reduction of the resulting alpha-nitro-naphthalene-beta-monosulfo-acid) and 6 kilos (six kilograms) of soda-ash in 150 liters (one hundred and fifty liters) of water. After the mixture has been agitated some hours the formation of the amido-azo body is complete. The latter is then transformed into the diazo body by addition of 30 kilos (thirty kilograms) of muriatic acid of 20° Baumé and 7 kilos (seven kilograms) of sodium nitrite in aqueous solution and mixed with a cold solution of 14.3 kilos (fourteen and three-tenths kilograms) of alpha-naphthylamin in 500 liters (five hundred liters) of water and 12 kilos (twelve kilograms) of muriatic acid, or in 100 liters (one hundred liters) of alcohol. The so-formed coloring-matter is transformed into the sodium salt by addition of soda, and is then salted out, pressed, and dried. This coloring-matter forms a blackish-green amorphous powder with metallic luster and dyes a bluish-black shade on wool in an acid bath. It is easily soluble in water with a violet-blue color, which changes into a greenish blue on addition of ammonia. In concentrated sulfuric acid it gives a green solution. In spirits it is almost insoluble.

Now, what we claim is—

As a new article of manufacture the new coloring matter of the formula

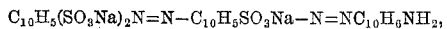

$$C_{10}H_5(SO_3Na)_2N=N-C_{10}H_5SO_3Na-N=NC_{10}H_6NH_2,$$

which forms after drying and pulverizing a blackish-green amorphous powder with metallic luster, and dyes wool in an acid bath a bluish-black shade; soluble in water, with violet blue color, which changes into a greenish-blue on the addition of ammonia; in concentrated sulfuric acid it gives a green solution; nearly insoluble in spirits and producible from alpha$_1$ naphthylamine beta$_2$ beta$_3$ disulfonate of sodium, alpha$_1$ naphthylamine beta$_4$ monosulfonate of sodium and alphanaphthylamin.

In testimony whereof we have signed our names to this specification in the presence of two subscribing witnesses.

FRIEDRICH KRECKE.
IGNAZ ROSENBERG.

Witnesses:
CARL ED. HAHN,
HEINRICH MISCHLER.